(12) United States Patent
Joubert et al.

(10) Patent No.: US 8,069,539 B2
(45) Date of Patent: Dec. 6, 2011

(54) UNIVERSAL END FITTING AND FASTENER ASSEMBLY COMPRISING SUCH AN END FITTING

(75) Inventors: Thierry Joubert, Ambert (FR); Xavier Joubert, Ambert (FR)

(73) Assignee: Joubert Productions, Ambert (FR)

( * ) Notice: Subject to any disclaimer, the term of this patent is extended or adjusted under 35 U.S.C. 154(b) by 574 days.

(21) Appl. No.: 11/852,491

(22) Filed: Sep. 10, 2007

(65) Prior Publication Data

US 2008/0080928 A1    Apr. 3, 2008

(30) Foreign Application Priority Data

Sep. 29, 2006  (FR) ..................................... 06 54019
May 16, 2007  (FR) ..................................... 07 55105

(51) Int. Cl.
*F16B 7/20*    (2006.01)

(52) U.S. Cl. ...... 24/265 H; 24/136 R; 24/369; 403/275; 403/349

(58) Field of Classification Search .................... 24/369, 24/136 R, 265 H, 122.6; 160/371, 385, 394, 160/398, 404; 114/230.2; 403/275, 349
See application file for complete search history.

(56) References Cited

U.S. PATENT DOCUMENTS

| | | | |
|---|---|---|---|
| 0,195,400 A | | 9/1877 | Richard |
| 1,843,360 A * | | 2/1932 | Handel ........................ 403/368 |
| 1,982,183 A * | | 11/1934 | Tarbox ........................ 403/331 |
| 3,124,385 A | | 3/1964 | Neptune |
| 3,707,304 A * | | 12/1972 | Gostling ....................... 403/293 |
| 3,718,540 A * | | 2/1973 | Bailey .......................... 204/272 |
| 3,751,772 A * | | 8/1973 | Grandjanny ................. 24/115 A |
| 3,776,586 A * | | 12/1973 | Ahlgren et al. ............ 294/102.1 |
| 4,037,909 A * | | 7/1977 | Trompeter et al. ........... 439/584 |
| 4,392,279 A * | | 7/1983 | Schwager ..................... 24/595.1 |
| 4,420,276 A * | | 12/1983 | Roberts ......................... 405/224 |
| 4,474,488 A * | | 10/1984 | Pinkerton et al. .............. 403/24 |
| 4,678,361 A * | | 7/1987 | Steinkamper et al. ..... 403/359.2 |
| 4,787,592 A * | | 11/1988 | Aoshika ........................ 248/327 |
| 4,893,975 A * | | 1/1990 | Anthony ......................... 411/87 |
| 4,955,750 A * | | 9/1990 | Goran ............................ 403/306 |
| 5,136,756 A * | | 8/1992 | Krauss ......................... 24/265 H |
| 5,383,259 A * | | 1/1995 | McIntire .......................... 24/300 |
| 5,546,639 A * | | 8/1996 | Lacore et al. ............... 24/265 H |
| 5,695,365 A * | | 12/1997 | Kennedy et al. .............. 439/638 |
| 5,813,790 A * | | 9/1998 | Goran, Jr. ...................... 403/283 |
| 6,322,306 B1 * | | 11/2001 | Dutton ........................... 411/121 |
| 6,561,841 B2 * | | 5/2003 | Norwood et al. ............. 439/489 |
| 6,921,283 B2 * | | 7/2005 | Zahlit et al. ................... 439/489 |
| 7,066,103 B2 * | | 6/2006 | Palmquist .................. 114/230.2 |
| 2006/0099838 A1 * | | 5/2006 | Meyers ......................... 439/134 |

FOREIGN PATENT DOCUMENTS

| | | |
|---|---|---|
| BE | 0423484 | 10/1937 |
| DE | 19529269 A1 | 2/1997 |
| FR | 2811488 A1 | 8/2006 |
| GB | 23404369 | 3/1997 |

\* cited by examiner

*Primary Examiner* — Robert Sandy
*Assistant Examiner* — Rowland D Do
(74) *Attorney, Agent, or Firm* — Heslin Rothenberg Farley & Mesiti P.C.

(57) ABSTRACT

An end fitting comprises a spigot end designed for reversibly fixing a wire rope to any type of functional part integral with or attached to a socket end. This spigot end is defined by an outer shell which is cylindrical overall; the shell comprising at least one fin. The spigot end comprises an axial housing designed to accommodate the wire rope. The shell has at least one through opening capable of accommodating an element for attaching said wire rope such as a pin or a rope fastener which passes through the wire rope. The spigot end is designed to cooperate with said socket end like a bayonet.

17 Claims, 5 Drawing Sheets

UNIVERSAL END FITTING AND FASTENER ASSEMBLY COMPRISING SUCH AN END FITTING

CROSS REFERENCE TO RELATED APPLICATIONS

This application claims priority from French patent application No. 07 55105, filed on May 16, 2007, and French patent application No. 06 54019, filed on Sep. 29, 2006, the entire disclosures of which are hereby incorporated herein by reference.

FIELD OF THE INVENTION

The present invention relates firstly to a spigot end for reversibly fastening a wire rope to a functional part equipped with a socket end and, secondly, an assembly consisting of such spigot and socket ends.

The term "functional part" within the meaning of the invention is construed as any type of part which fulfils one or more specific functions requiring cooperation with a wire rope. Consequently, the present invention is not confined to any one particular application area, on the contrary, its object can be employed as a "universal" means of fixing.

DESCRIPTION OF THE PRIOR ART

Functional parts such as a hook or a spring hook which includes means of attaching an elastic or non-elastic wire rope on the end of which the functional part will be fitted are known from the prior art. Depending on tensile strength requirements, the means of attachment can be a nut for constricting the wire rope which will deform the wire rope when it is tightened. Also, it can be a component which has teeth which "bite" into the wire rope in order to retain it by friction.

Because such a means of attachment is integral with the functional part, when one wishes to detach the wire rope in order to attach it to another functional part, it is necessary to release the wire rope from the friction forces to which it is subjected and then insert it into the new functional part and, finally, tighten the new means of fixing to the wire rope.

However, the first disadvantage is the fact that the wire rope is locally damaged each time fixing by friction takes place so that attachment of the wire rope withstands smaller and smaller tensile stresses until this poses a danger or makes it necessary to replace the wire rope.

In addition, not all functional parts comprise the same means of attaching the wire rope and the latter is sometimes unable to cooperate with certain functional parts. Thus it may sometimes be necessary to have several different wire ropes of different diameters or made of different materials, each wire rope being specifically intended to cooperate with a specific functional part. Purchasing such a range of wire ropes for use with functional parts can be very expensive.

In addition, the number of wire ropes required is the same as the number of functional parts. In fact, in most cases, it is not possible to change the functional part without damaging the wire rope.

The object of the present invention therefore relates to a means of attaching a wire rope which is not integral with the functional part and which is not specifically dedicated to a specific wire rope.

OBJECT OF THE INVENTION

The object of the invention therefore relates to a generic or "universal" spigot end and a fastener assembly making it possible to attach a single wire rope successively to several hooks or types of hook and, generally speaking, to any type of functional part capable of fulfilling different functions.

The invention relates to a spigot end for reversibly attaching a wire rope to any type of functional part incorporating or attached to a socket end.

According to the invention, the outer shell of the spigot end is cylindrical overall and comprises at least one fin which protrudes relative to said shell.

In addition, it comprises an axial housing designed to accommodate wire rope and its outer shell has at least one through-opening capable of accommodating a means of attaching the wire rope such as a pin or rope fastener which passes through said wire rope. This spigot end is designed to cooperate with said socket end like a bayonet.

In other words, the spigot end which is the object of the invention forms a sleeve in which the wire rope is attached by a pin passing through the wire rope or any other equivalent system whilst the outer wall which defines the spigot end comprises at least one protrusion enabling said end fitting to be fixed in a matching socket end like a bayonet. The term "overall" refers here to the main body of the spigot end, excluding its fin or fins. The term "bayonet" is taken to mean a swiveling, gliding linkage, the movements of which are restrained or guided by fins.

In practice, the shell or wall which defines the end fitting may have two or four openings which are diametrically opposite, two by two, relative to the axis of revolution of said shell.

This alternative embodiment involves attaching the wire rope by means of a rope fastener which is therefore equipped with two fixing pins rather than one pin.

In one particular embodiment of the invention, the axial housing designed to accommodate the wire rope may be open at both ends. This makes it possible to facilitate positioning the wire rope inside the spigot end.

According to a first embodiment of the invention, the shell may comprise two symmetrical diametrically opposite fins relative to the axis of revolution of the shell.

According to a second embodiment of the invention, the shell may comprise four symmetrical diametrically opposite fins, two by two, relative to the axis of revolution of said shell.

In other words, the fins form protrusions relative to the outer shell of the spigot end. These protrusions are confined to tangential portions of this shell. Thus, it is possible to axially insert the spigot end into the matching socket end and then turn or swivel the spigot end on itself in the socket end in order to line up the fins with the corresponding limit stop surfaces provided in the socket end.

In practice, the fins can be formed by crown segments having a rectangular cross-section which are concentric with said shell.

The term "rectangular" must not be construed literally here because it does not exclude the possibility of providing a chamfer in order to avoid injuring the user. This aspect determines a fin shape which is relatively inexpensive to manufacture.

According to one practical embodiment of the invention, the openings may be machined through said fins. This positioning of openings makes it possible to insert the means of attachment (pin or rope fastener) into a thicker part, thus making the assembly mechanically stronger.

In practice, the shell may have a recess at the level of each of the openings, this recess being intended to accommodate the tip of the attachment means.

This configuration makes it possible to limit the parts that protrude beyond the shell of the spigot end.

According to another aspect of the invention, one of the ends of the spigot end may have a radial shoulder designed to cooperate with the functional part. Such a shoulder is designed to push against the end of the socket end and, generally speaking, the functional part with which it is intended to cooperate.

According to yet another aspect of the invention, one of the ends of the spigot end has a partial extension forming a protrusion designed to cooperate with the bottom of the socket end with which it is intended to cooperate. At the same time, the shell of said spigot end has, in the vicinity of the end in question, a cut-out capable of giving the end fitting, in this area, a certain degree of elasticity and, in particular, enabling it to bend slightly when it cooperates with the corresponding socket end.

Also, the present invention relates to a fastener assembly comprising a functional part designed to be reversibly attached to an elastic or non-elastic wire rope. This attachment of the wire rope to said functional part is obtained by means of a spigot end of the type described earlier, said end fitting being designed to cooperate with a socket end integral with or attached to said functional part, said socket end having a housing, the geometry of which matches that of the spigot end so as to cooperate reversibly with said socket end like a bayonet.

The fastener assembly which is the subject of the present invention consists of a spigot end and a socket end which are easy to assemble and disassemble. It is therefore possible to fit the wire rope successively and quickly on different functional parts and this lends the assembly its "universal" or generic character, consequently providing a high degree of modularity.

In practice, the socket end may have, for each of said fins, a housing, the geometry of which matches the geometry of the fin to be accommodated, this housing comprising, in particular, an axial retention surface capable of absorbing the tensile stresses exerted on the wire rope.

In other words, the housing of this socket end comprises hollow or opened out crown segments making it possible to accommodate the fins, after locking by rotating the spigot end. These hollow segments thus act as axial limit stops which prevent the spigot end and hence the wire rope from detaching itself from the socket end and hence the functional part.

According to one practical embodiment of the invention, the socket end may have an axial limit stop surface provided with a spike designed to repel said spigot end in the housings provided for said fins.

Thus, the socket end comprises non-return means designed to cooperate with the spigot end and capable of preventing inopportune detachment of said spigot end from the socket end.

The spigot end is in an axially "locked" position because it is fixed to the socket end in a safe position which can only be exited when the wire rope is no longer being pulled.

Practically, the functional part is selected from a group comprising a hook, a hook with an elastic catch, a lug, a spring hook or a screwed plate.

Consequently, the assembly which is the object of the present invention has a universal aspect.

BRIEF DESCRIPTION OF THE DRAWINGS

The manner in which the invention can be implemented and the resulting advantages will be made more readily apparent from the description of the embodiment below. This example is given by way of example only, reference being made to the accompanying drawings in which:

FIG. 1b is a schematic perspective cutaway view of the spigot end in FIG. 1a.

DESCRIPTION OF THE PREFERRED EMBODIMENTS

Figure 1A:
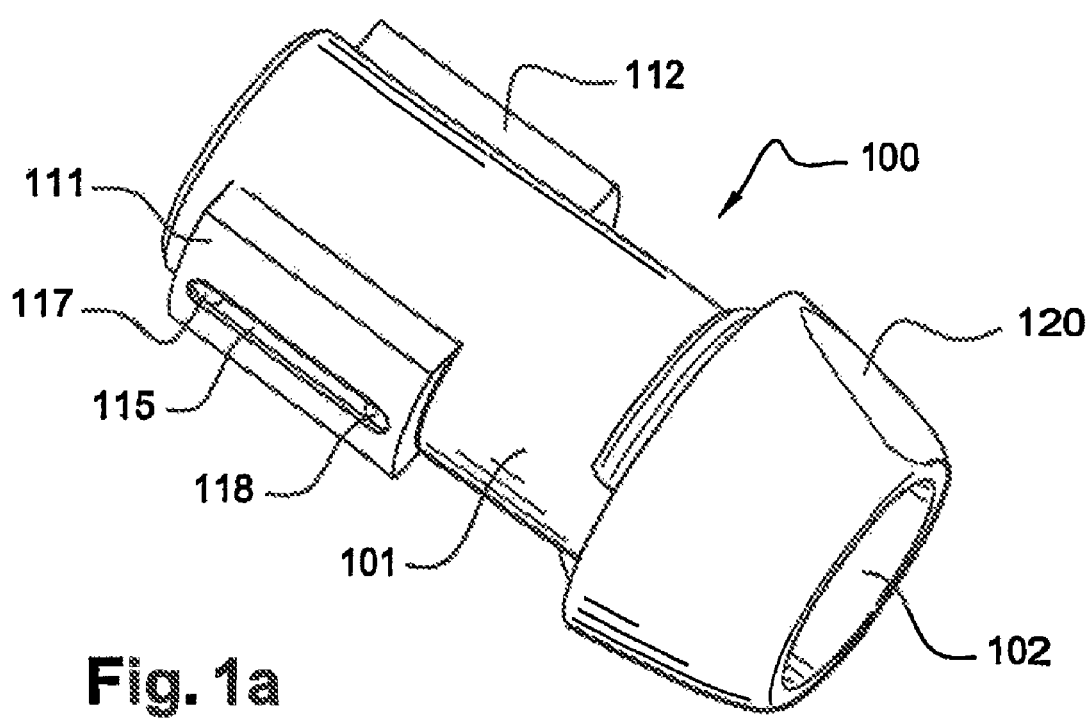
FIG. 1a is a schematic perspective view of a spigot end in accordance with a first embodiment of the invention.
Figure 1B:
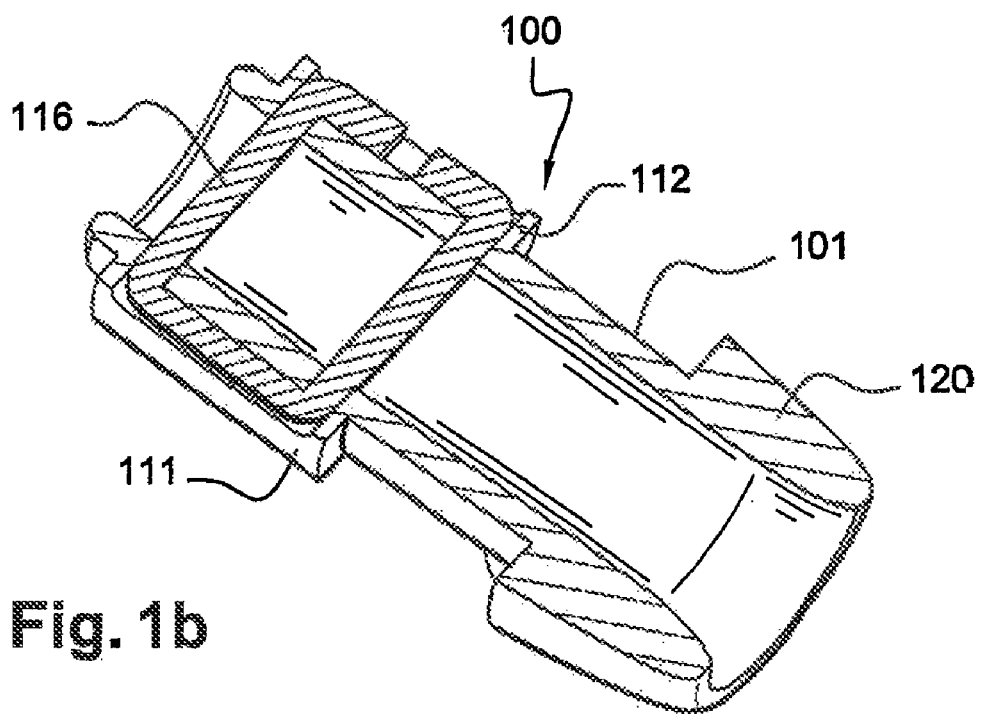

FIGS. 1a and 1b show a first embodiment of spigot end 100 which is the subject of the invention. Spigot end 100 comprises an outer shell 101 which is cylindrical overall and defines the main body of spigot end 100. Also, this shell 101 ends with a shoulder 120 which is used as an axial limit stop when the spigot end is in position in a matching socket end integral with or attached to a functional part. The external profile of shoulder 120 is determined depending on the constraints for gripping spigot end 100 and the aesthetic constraints associated with the connection of the volumes of the various parts.

Spigot end 100 comprises an axial housing 102 which here opens out at both ends of spigot end 100. Nevertheless and as required, axial housing 102 can be closed at one end. Axial housing 102 is designed to accommodate the wire rope (not shown) which is intended to be attached to spigot end 100.

To obtain this attachment of the wire rope inside housing 102, shell 101 has four openings 117, 118, etc. which are diametrically opposite relative to the axis of revolution of shell 101. Thus, the four openings are opposite each other two by two as shown in FIG. 1b. Openings 117 and 118 thus face two openings drilled in the wall of the shell opposite the axis of revolution. This way, it is possible to insert a rope fastener 116 through openings 117 and 118 and then reclose this rope fastener 116 at the outlet of the two opposite openings. Rope fastener 116 thus makes it possible to attach a wire rope in housing 102 of spigot end 100 and hence maintain their cohesion when the wire rope is subjected to tensile stress.

According to one advantageous aspect of the invention, a recess 115 is made in each of fins 111, 112 so as to fit the tip and the bases of rope fastener 116. Thus, no protrusion exceeds fins 111 and 112 and this facilitates cooperation of spigot end 100 with the matching socket end and avoids any protruding parts potentially capable of causing injury. Recess 115 here consists of a groove made by milling or molding in the middle of each fin 111 and 112.

In the example shown in the Figures, spigot end 100 is a plastic part but it can also be made of metal. Spigot end 100 can be obtained by machining or by molding operations and re-machining. The dimensions of spigot end 100, in particular the thickness of the walls that form its outer shell, are determined by the mechanical stresses likely to be exerted on spigot end 100 through the wire rope under tension. Thus the dimensions can be adapted to suit the intended application.

Figure 2:
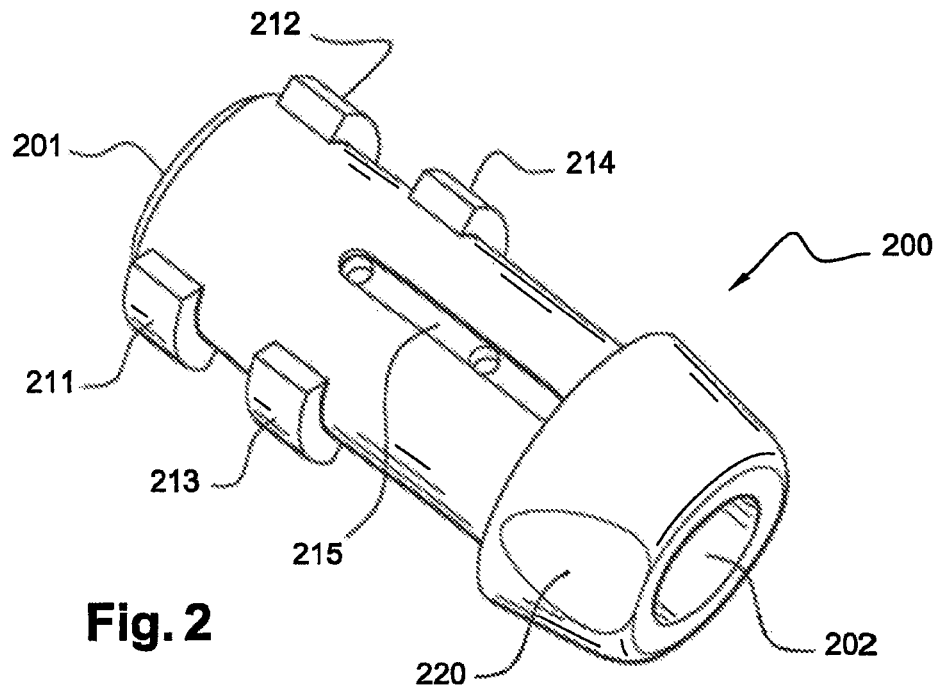
FIG. 2 is a schematic perspective view of a spigot end in accordance with a second embodiment of the invention.

FIG. 2 shows spigot end 200 in accordance with the variation in FIG. 1. Equivalent elements have the same reference numbers plus 100.

Thus, spigot end 200 has outer shell 201 which is cylindrical overall and axial housing 202 which is open at both ends. The term "cylindrical" here denotes the shape of a straight cylinder. Similarly, spigot end 200 has shoulder 220 similar to shoulder 120 of spigot end 100.

In contrast, spigot end 200 has four rather than two fins 211-214 in the form of crown segments having a rectangular cross-section.

These four fins 211-214 are, according to the invention, diametrically opposite, two by two, relative to the axis of revolution of shell 201. In fact, increasing the number of fins makes it possible to improve retention of spigot end 200 in the matching socket end.

Also, the through-openings here are not machined in fins 211-214 but in outer shell 201. Nevertheless, they are also made at the level of recess or flat 215 which is capable of accommodating the protruding parts of the means of attaching the wire rope to spigot end 200.

Figure 3:
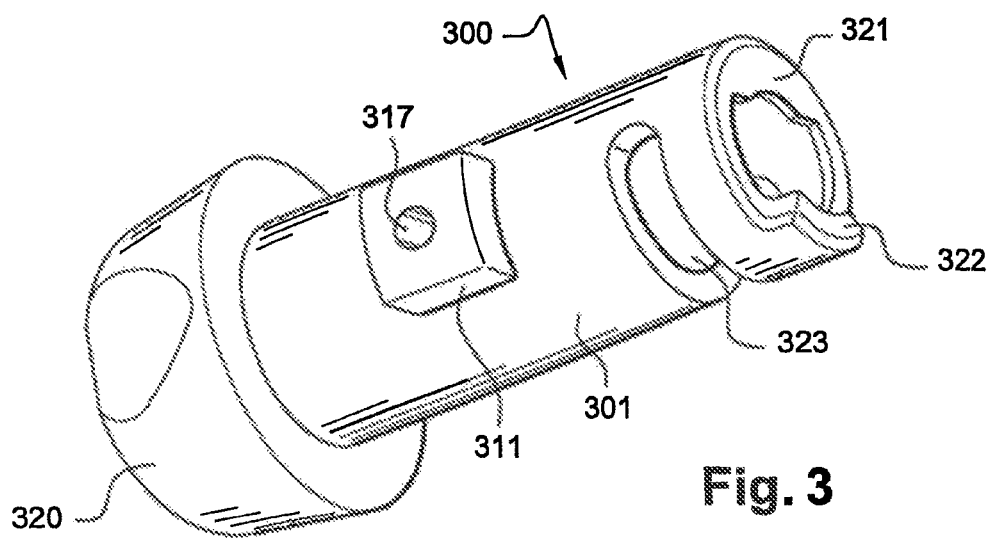
FIG. 3 is a schematic perspective view of a spigot end in accordance with a third embodiment of the invention.

FIG. 3 shows a spigot end 300 which has a structure similar to the two previous end fittings. This end fitting also has an overall cylindrical outer shell 301. In the example described, said spigot end has two fins 311 designed, as already described, to cooperate with corresponding recesses or housings made in the socket unit. These fins 311 are also provided with an opening 317 designed to let through a rope fastener for fastening the wire rope at this level. The spigot end has a shoulder 320 similar to shoulder 120 of spigot end 100.

In this embodiment, end 321 of the spigot end opposite shoulder 320 comprises a bump 322 which protrudes relative to the plane which bounds said end. This bump 322 is, in this case, in the form of a crown segment. It is designed to cooperate with the bottom of the socket end with which the spigot end is designed to cooperate as described more precisely in relation to FIGS. 6a to 6c.

In addition, shell 301 of said spigot end has, in the vicinity of the end in question 321, a cut-out 323 which extends over part of its circumference. This cut-out 323 is designed to give the spigot end a certain degree of elasticity in this area despite the fact that said end fitting is made of a relatively rigid plastic material (polyoxymethylene or polyamide).

Because of this cut-out 323, spigot end 300 is capable of bending slightly when bump or protrusion 322 cooperates with the bottom of the corresponding socket end and, in particular, makes it possible to force reversible locking of the spigot unit in the socket unit as described below in greater detail.

Figure 4A:
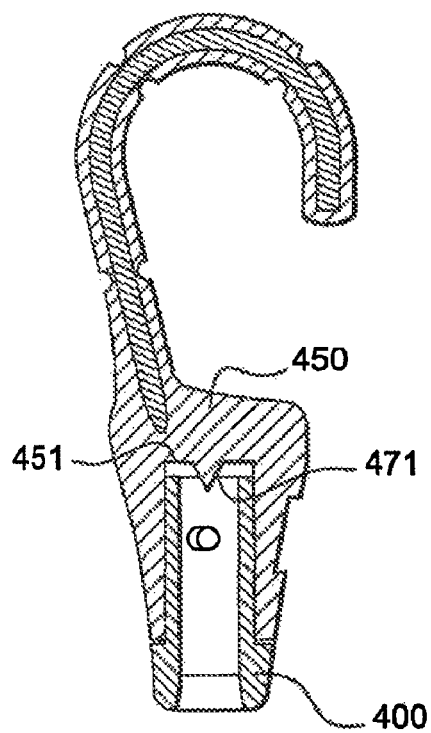
FIGS. 4a and 4b are schematic cross sectional views of an assembly in accordance with the invention.
Figure 4B:
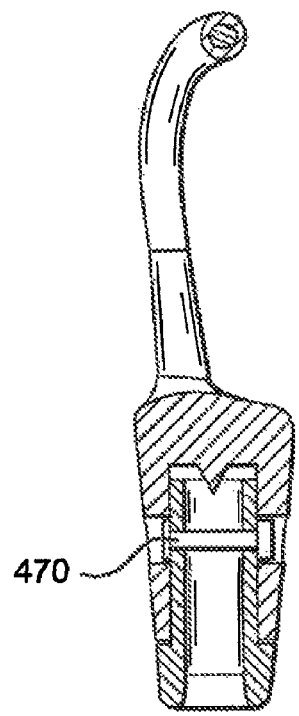

FIGS. 4a and 4b show an assembly in accordance with the present invention consisting of spigot end 400 and a functional part, in this case hook 450, which incorporates socket end 451, the geometry of which matches the geometry of spigot end 400. Spigot end 400 is in accordance with one or other of the embodiments shown in FIG. 1 or 2. It is represented here in its secured position, i.e. fully inserted into socket end 451 and swiveled on itself in a position where its fins line up with the corresponding hollow housings of socket end 451 so as to form an axial limit stop which resists any tensile stress.

Figure 4C:
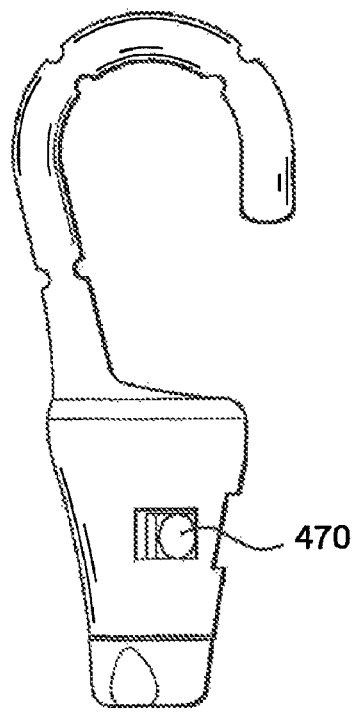
FIG. 4c is a side view of the assembly shown in FIGS. 4a and 4b.
Figure 4D:
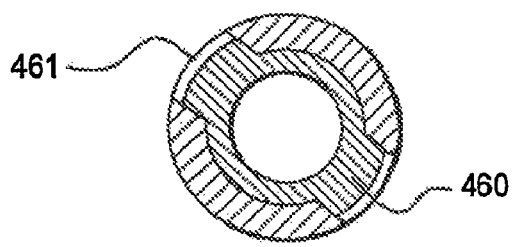
FIG. 4d is a schematic cross sectional view along line D-D of the assembly shown in FIGS. 4a and 4c.

FIG. 4c shows an attachment means 470 consisting of a nail or pin which can also be seen in FIG. 4b.

Besides this, cross-sectional view 4d shows two axial grooves 460 and 461 made in the lower part of socket end 451 in order to accommodate the fins of spigot end 400 when the latter is initially inserted translationally before the locking phase by swiveling. Obviously, the dimensions of each of the grooves 460 and 461 match the dimension of the fins of spigot end 400 including guidance clearance.

Thus, once the spigot end is in its final locked position as shown in FIG. 4c, tensile stresses exerted on the wire rope are transmitted by nail 470 to spigot end 400 and then, via the fins, to socket end 451 and hence finally to functional part 450 consisting here of a hook.

Also, the axial limit stop of socket end 451 is provided with a spike 471 which makes it possible to repel spigot end 400 when the latter reaches the end of its axial and radial travel. The wire rope is thus slightly compressed by spike 471 when spigot end 400 is in the process of swiveling on itself and is then released when spigot end 400 "drops back" into the housings provided for this effect for the fins. To achieve this, these housings are slightly axially offset relative to the intermediate position in which the spigot end swivels on itself. This produces a non-return function which prevents, without any external action, detachment of the spigot end from the functional part.

However, unlike assemblies according to the prior art, it is easy to detach spigot end 400 from socket end 451 in order to attach the wire rope to another matching socket end attached to another functional part.

Figure 5:
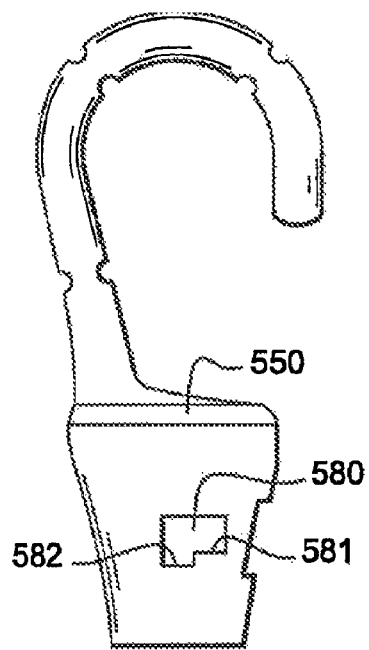
FIG. 5 is a schematic representation of the socket unit in accordance with another embodiment of the invention.

FIG. 5 shows another embodiment of the socket unit in accordance with the invention, more especially designed to cooperate with spigot end 300 described in FIG. 3.

This socket end is built into functional part 550 which once again consists of a hook. As already described in relation to FIGS. 4a to 4d, the geometry of this socket unit matches that of spigot end 300.

More specifically, said socket end is pierced by two holes 580 which may or may not pass through it and are designed to cooperate with fins 311, 312 of spigot unit 300. These holes 580 have, at the level of their base, a step or discontinuity 581 which defines an area 582 for stably accommodating said fins. Although only one hole is shown in FIG. 5, the other hole diametrically opposite is symmetrical with the hole shown relative to the axis of revolution of the socket end.

Said discontinuity 581 actually continues inside the socket end as far as the grooves similar to grooves 460, 461 of the socket end described in relation to FIGS. 4a to 4d which are also present in this embodiment in order to make it possible to insert the spigot end complete with its fins into said socket end. In order to force the lock consisting of said discontinuities 581, one must exert pressure on said spigot end in the direction of the bottom of the socket end, thus allowing the base of the fins to pass over said discontinuities, until, still due to cooperation of the spigot end with the socket end, said fins are naturally accommodated in stable reception areas 582 and are maintained there.

In other words, once one has overcome the opposing resistance due to cooperation of axial limit stop or bottom 583 of the socket end with bump 322 of the spigot end whilst exerting a rotational force on the latter, said cooperation exerts a spring effect and causes positioning and retention of said fins in this stable position 582, thereby constituting a non-return mechanism and preventing any risk of inopportune detachment of the spigot end from the functional part.

Detaching the spigot end from the socket end uses the same principle, only the direction in which the spigot end is rotated is reversed.

Figure 6A:
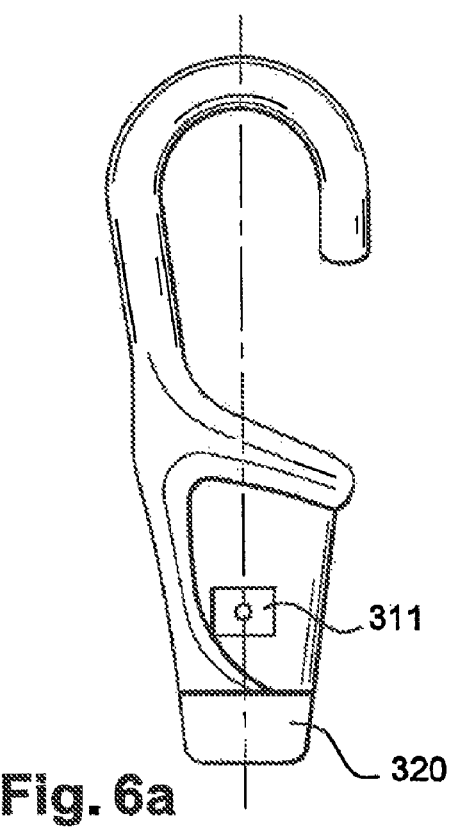
FIGS. 6a, 6b and 6c are schematic views of the structural assembly using the spigot unit in FIG. 3 and the socket unit in FIG. 5 shown respectively as a side view and cross sectional view.
Figure 6B:
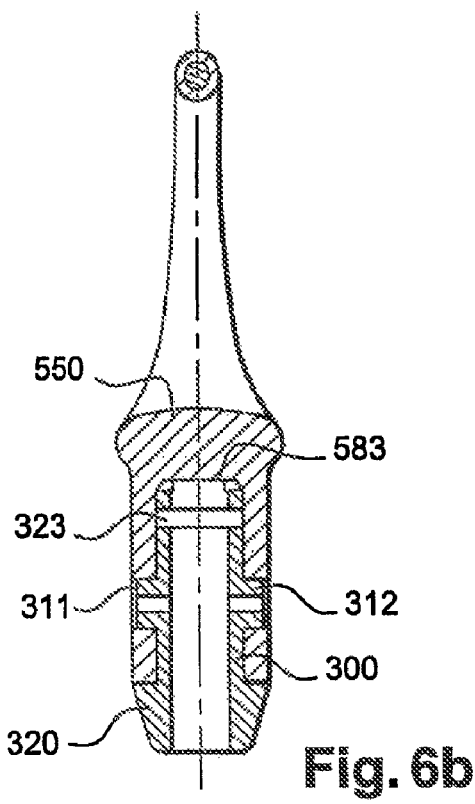
Figure 6C:
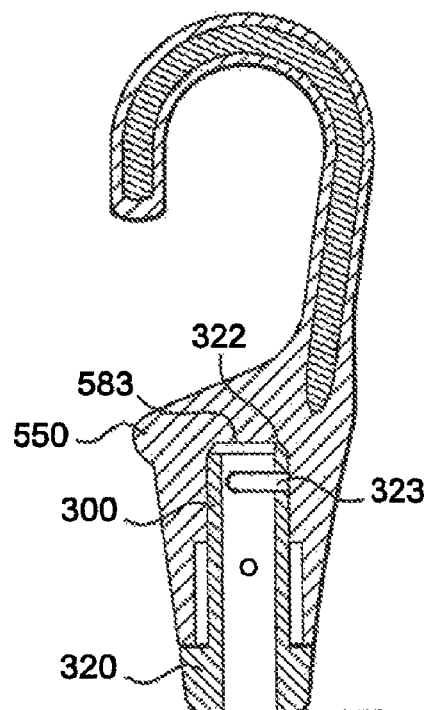

FIGS. 6a to 6c show, in greater detail, cooperation of spigot end 300 with functional part 550.

The cooperation of bump or protrusion 322 of the spigot end with the axial limit stop or bottom 583 of the socket end of functional part 550 is illustrated in particular.

Figure 7A:
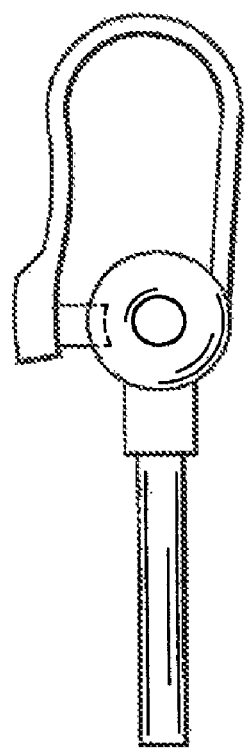
FIGS. 7a to 7c show various functional parts capable of incorporating the object of the present invention.
Figure 7B:
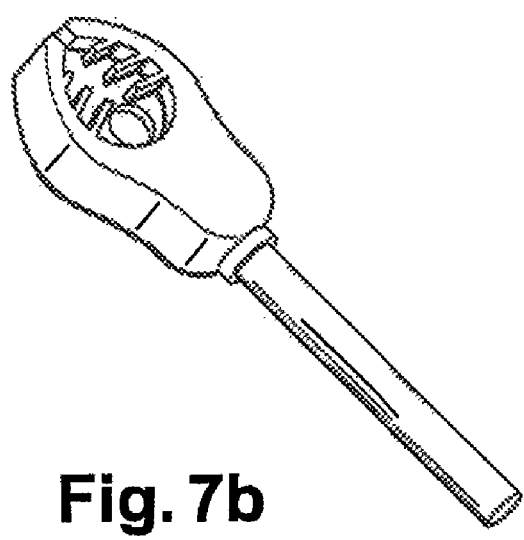
Figure 7C:
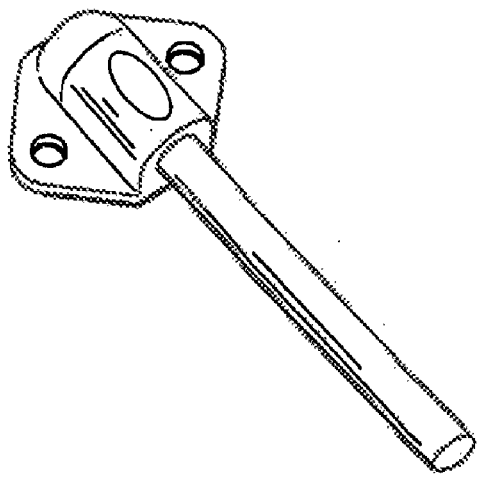

FIGS. 7a to 7c show examples of various functional parts such as a hook with an elastic catch (FIG. 7a), a screwed plate (FIG. 7b) and an adjustable end fitting (FIG. 7c).

Other embodiments of the invention are possible without extending beyond the scope of the invention.

The invention claimed is:

1. A spigot end for reversibly fastening a wire rope to any type of functional part which is integral with or attached to a socket end, the spigot end comprising:

an outer shell which is cylindrical overall in shape, said outer shell having a raised longitudinally extending shoulder at one end, an opening axially extending from said one end for a length into an interior of said shell, said opening being sized to receive the wire rope throughout said length, and at least one fin protruding from a periphery of said outer shell, the longitudinally extending shoulder terminating at a first intermediate location on the outer shell, the at least one fin being longitudinally spaced from the raised shoulder and beginning at a second intermediate location on the outer shell more distant from the one end than the first intermediate location, said at least one fin being provided with at least one through hole extending radially in relation to an axis of revolution of said outer shell, said through hole intersecting said opening along said length; and said at least one fin of said spigot end being configured to connect with said socket end in a bayonet connection.

2. A spigot end as claimed in claim 1, wherein the outer shell is open at both ends.

3. A spigot end as claimed in claim 1, wherein the outer shell has two symmetrical diametrically opposite fins relative to the axis of revolution of said shell.

4. A spigot end as claimed in claim 1, wherein the at least one fin comprises crown segments having a rectangular cross-section which segments are concentric relative to said shell.

5. A spigot end as claimed in claim 1, wherein the at least one through hole is machined through the at least one fin.

6. A spigot end as claimed in claim 1, in combination with a wire rope received in the opening, and a pin or other rope fastener mounted in the through hole and extending into said rope in said opening.

7. A spigot end as claimed in claim 1, wherein an other end of the outer shell opposite said one end has a partial peripheral extension extending axially beyond a plane bounding said other end, and forming an end fitting cooperating with a bottom or axial limit stop of the socket end with which the spigot end is intended to cooperate.

8. A spigot end as claimed in claim 7, wherein the outer shell has, in a vicinity of the other end, a cut-out longitudinally spaced inwardly of the other end and extending over a part of a circumference on an outer surface of the outer shell giving the end fitting a certain degree of elasticity in said vicinity.

9. A spigot end as claimed in claim 8, wherein the cut-out enables the end fitting to bend slightly during cooperation with a corresponding socket end.

10. A fastener assembly comprising a functional part to be reversibly attached to an elastic or non-elastic wire rope, wherein the wire rope is attached to said functional part by the spigot end as claimed in claim 1, said spigot end cooperating with a socket end integral with or attached to said functional part, said socket end having a housing with a geometry which matches a geometry of the spigot end so as to connect with said socket end reversibly in a bayonet connection.

11. A fastener assembly as claimed in claim 10, wherein the socket end has, for each of fins on the spigot end, a housing with a geometry which matches a geometry of a fin to be accommodated, said housing comprising an axial retention surface for absorbing tensile stresses exerted on the wire rope.

12. A fastener assembly as claimed in claim 10, wherein the socket end comprises two axial grooves in a lower part to accommodate fins of the spigot end when the spigot end is initially inserted translationally into said socket end before a locking phase by swiveling.

13. A fastener assembly as claimed in claim 12, wherein the socket end comprises non-return means cooperating with the spigot end and opposing inopportune detachment of said spigot end from the socket end.

14. A fastener assembly as claimed in claim 13, wherein the non-return means comprises two holes which may or may not pass through the assembly and are adapted to cooperate with fins of the spigot end, said holes having, at a base level, a discontinuity defining an area for stably accommodating said fins and extending into the socket end as far as the grooves.

15. A fastener assembly as claimed in claim 10, wherein the functional part is chosen from a group consisting of a hook, a hook with an elastic catch, a lug, a spring hook and a screwed plate.

16. A fastener assembly as claimed in claim 10, further comprising means, mounted in said through hole, for attaching said wire rope.

17. A fastener assembly as claimed in claim 16, wherein said means for attaching comprises a pin or other rope fastener extending into rope received in said opening.

* * * * *